United States Patent
Wu et al.

(10) Patent No.: US 8,314,884 B2
(45) Date of Patent: Nov. 20, 2012

(54) DEVICE AND METHOD FOR ADAPTIVE BLENDING MOTION COMPENSATION INTERPOLATION IN FRAME RATE UP-CONVERSION

(75) Inventors: Hung Wei Wu, Tai Pei County (TW); Chiung-Fu Chen, Peng Hu County (TW); Chih-Yu Chang, Hsin Chu (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 415 days.

(21) Appl. No.: 12/700,182

(22) Filed: Feb. 4, 2010

(65) Prior Publication Data
US 2010/0245664 A1 Sep. 30, 2010

(30) Foreign Application Priority Data

Jun. 30, 2009 (TW) ................................ 98122098 A
Aug. 6, 2009 (TW) ................................ 98126479 A

(51) Int. Cl.
*H04N 7/01* (2006.01)
*H04N 5/14* (2006.01)
*H04N 7/12* (2006.01)
*H04N 11/02* (2006.01)

(52) U.S. Cl. ................... 348/441; 348/699; 375/240.12
(58) Field of Classification Search ...................... None
See application file for complete search history.

(56) References Cited

U.S. PATENT DOCUMENTS

| | | | | |
|---|---|---|---|---|
| 4,992,870 | A | * | 2/1991 | Samad ........................ 348/441 |
| 5,400,087 | A | * | 3/1995 | Uramoto et al. ............... 348/699 |
| 2002/0064228 | A1 | * | 5/2002 | Sethuraman et al. ..... 375/240.12 |
| 2009/0059084 | A1 | * | 3/2009 | Okada et al. .................. 348/699 |

* cited by examiner

*Primary Examiner* — Jefferey Harold
*Assistant Examiner* — Sean Haiem
(74) *Attorney, Agent, or Firm* — Muncy, Geissler, Olds & Lowe, PLLC

(57) ABSTRACT

An adaptive blending MCI method and device thereof are disclosed in the embodiments of the present invention. The adaptive blending MCI method uses adjacent four motion vectors to get the corresponding pixels, and uses linear interpolation equation to blend four pixels to reduce block artifacts. The method uses adaptive weighting coefficient to favor reliable motion vector to avoid bad motion vector degrade image quality.

22 Claims, 9 Drawing Sheets

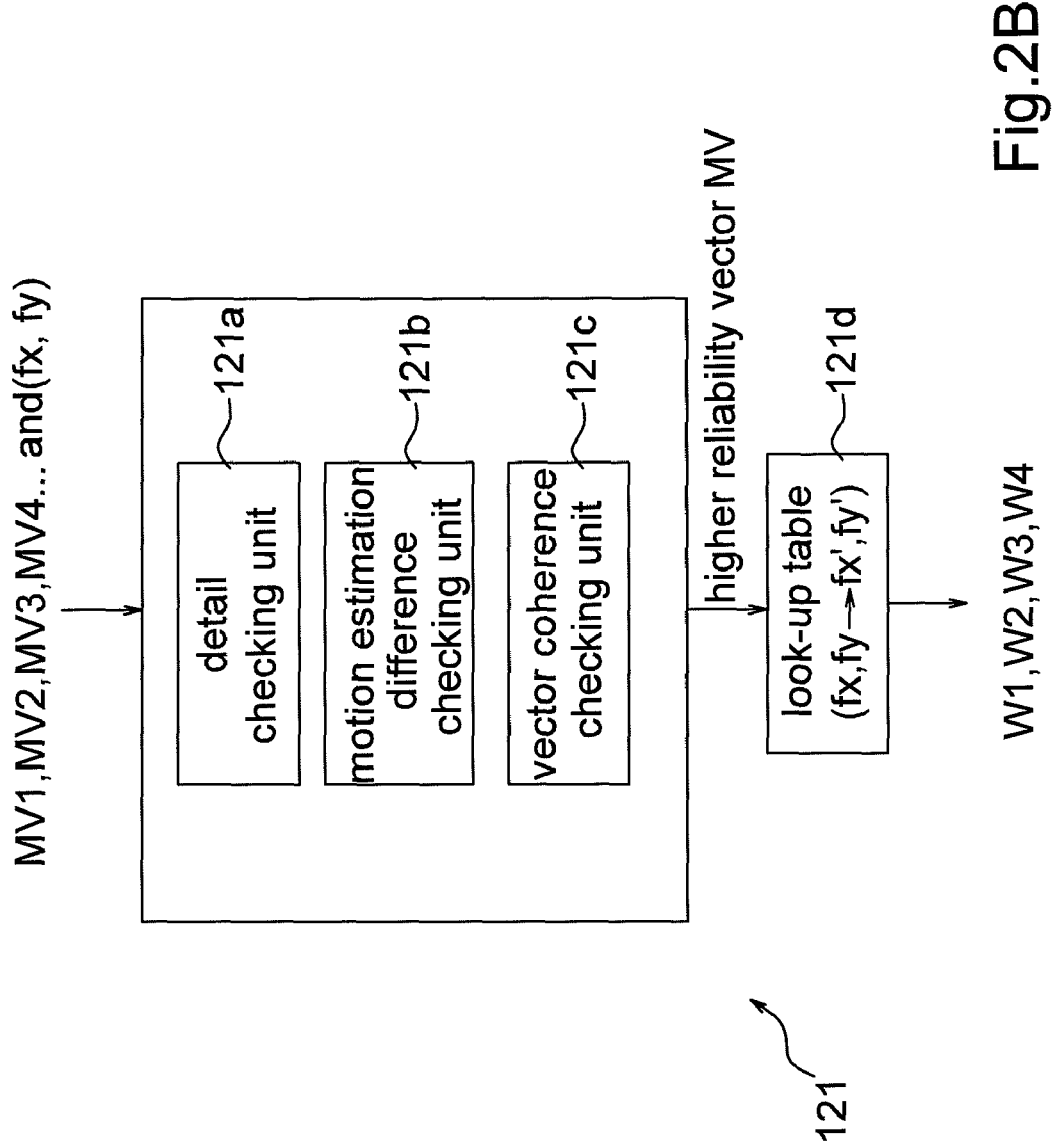

DEVICE AND METHOD FOR ADAPTIVE BLENDING MOTION COMPENSATION INTERPOLATION IN FRAME RATE UP-CONVERSION

BACKGROUND OF THE INVENTION (a) Field of the Invention

The invention relates to a frame rate up-conversion (FRC) technique, particularly to a device and a method for adaptive blending motion compensation interpolation (MCI).

(b) Description of the Related Art

The frame rate up-conversion (FRC) technique is to increase the frame rate of a video source and has been applied in various fields, such as low-bit network video transmission for bandwidth-saving, converting a video source with a frame rate of 25 Hz into a higher frame rate for reducing frame juddering, and applying in hold-type liquid crystal displays (LCD) for avoiding frame blurring and achieving clear image quality.

Most of the frame rate up-conversion (FRC) techniques use motion estimation (ME) to calculate the motion vector of an object and perform motion compensation interpolation (MCI) to allocate the moving object in different frames. Most of the motion estimation techniques utilize blocks in calculation. One of main purposes of a motion estimation technique is to reduce block artifacts caused by block interpolation. The prior technique uses a method of blending adjacent blocks to reduce block artifacts but generally such a method cannot differentiate the correctness of the adjacent blocks. Although some methods select adjacent blocks based on the reciprocal of the sum of absolute difference (SAD), the calculation is too complicate to assure the correctness of the adjacent blocks.

BRIEF SUMMARY OF THE INVENTION

One embodiment of the invention provides a motion compensation interpolation device, comprising an adaptive weighting unit and a blending unit. The adaptive weighting unit receives at least a frame where the frame comprises a plurality of blocks and allocates an interpolation block in a predetermined number of blocks where the interpolation block comprises at least one target pixel to be interpolated. The adaptive weighting unit receives a plurality of vectors corresponding to a plurality of adjacent blocks of the interpolation block, checks these vectors, and calculates a plurality of weighting values based on at least one vector that passes the check. The blending unit receives the corresponding pixel values of the vectors and generates the pixel value of the target pixel to be interpolated according to the weighting values and the pixel values.

One embodiment of the invention provides motion compensation interpolation method, comprising the following steps. At first, an interpolation block is allocated in a frame where the interpolation block comprises at least one target pixel to be interpolated. The reliability of the vectors corresponding to the adjacent blocks of the interpolation block is checked. Then, at least one preferred vector having high reliability is selected and a plurality of weighting values are generated based on the at least one preferred vector. The corresponding pixel values of the vectors are received and the pixel value of the target pixel to be interpolated is determined according to the weighting values and the pixel values.

BRIEF DESCRIPTION OF THE DRAWINGS

FIG. 2B shows a schematic diagram illustrating the adaptive weighting unit according to one embodiment of the invention.

DETAILED DESCRIPTION OF THE INVENTION

The following describes several preferred embodiments of the inventions, such as various electric circuits, elements, and related methods. Those who are skilled in the art should understand that the invention can be implemented by various methods, not limited by the following embodiments or characteristics in the embodiments. The well-known details will not be repeatedly described to avoid distracting the attention from the key point of the invention.

Furthermore, the image inputted into the image generating device, the adaptive blending MCI device and the method thereof according to the invention can be a frame or a field. The following examples are described by using a frame.

FIG. 1 shows a structural block diagram illustrating the image generating device according to one embodiment of the invention. Referring to FIG. 1, the image generating device 10 according to the invention comprises a motion vector estimation circuit 11 and a motion compensation interpolation circuit 12.

The operating method of the motion vector estimation circuit 11 is to divide the original inputted frame into a plurality of blocks where each block comprises N*M points (for example, 8*8 or 8*16) and then perform motion estimation (ME) to search for a position having the highest similarity in a to-be-matched frame (for example, the preceding frame). Thus, the relative position is the motion vector corresponding to this block. Then, searching for each corresponding vector of each block can generate all the vectors between two adjacent frames.

In one embodiment, the motion vector estimation circuit 11 receives a current frame F1 and a preceding frame F0 and divides the current frame F1 and the preceding frame F0 into the same number of blocks. The motion vector estimation circuit 11 compares a target block with a predetermined search area of the preceding frame F0 to calculate a plurality of motion estimation differences. By comparing the motion estimation differences, the motion vector estimation circuit 11 obtains the motion vector of the target block and the plurality of motion estimation differences corresponding to the target block. By repeating the above process, the whole frame is processed and then the motion vector estimation circuit 11 can generate all the vectors MV between the adjacent two frames.

It should be noted that the invention is not limited to this example. In another embodiment, a target block $B_i$ is compared with a predetermined search area of the current frame F1 to calculate a plurality of motion estimation differences and the motion vector MV of the target block.

Figure 1A:
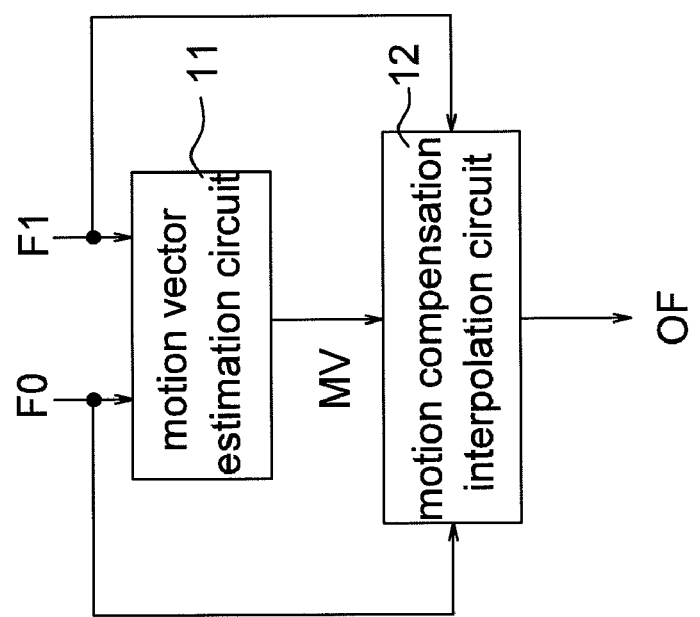
FIG. 1A shows a schematic diagram illustrating the imaging generating device according to one embodiment of the invention.
Figure 1C:
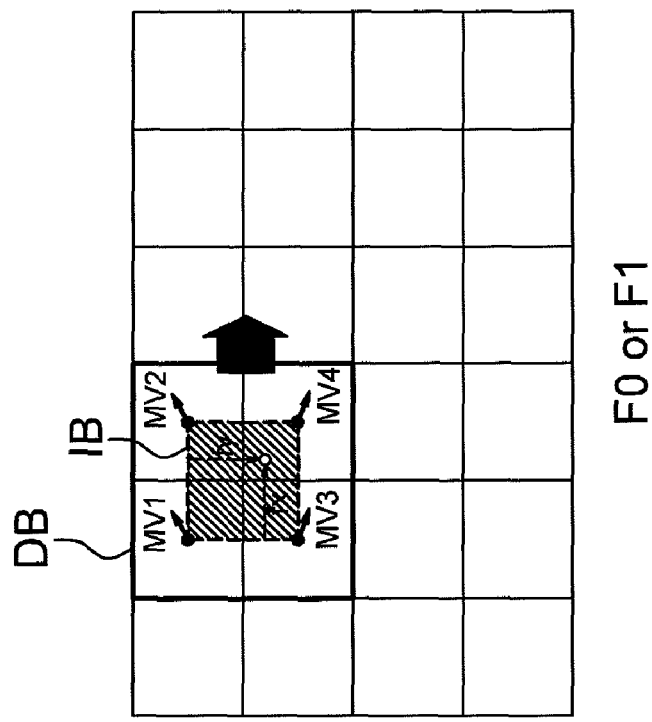
FIG. 1C shows a schematic diagram illustrating the block interpolation in a frame according to another embodiment of the invention.
Figure 1B:
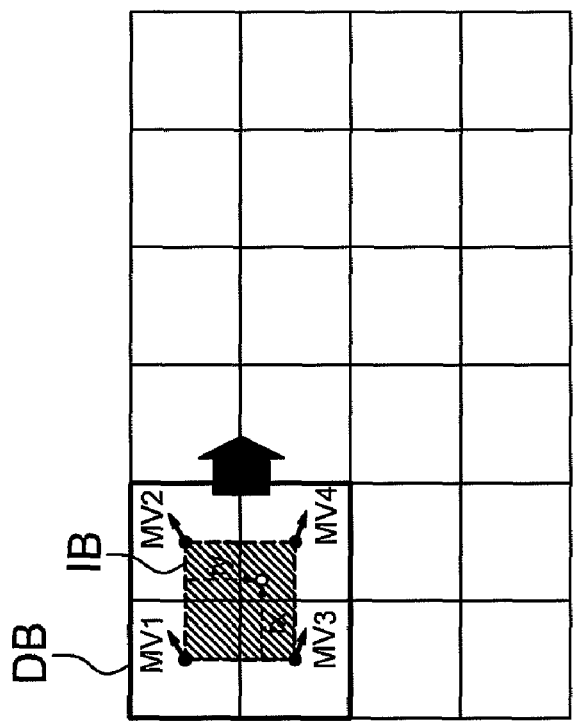
FIG. 1B shows a schematic diagram illustrating the block interpolation in a frame according to one embodiment of the invention.
Figure 1D:
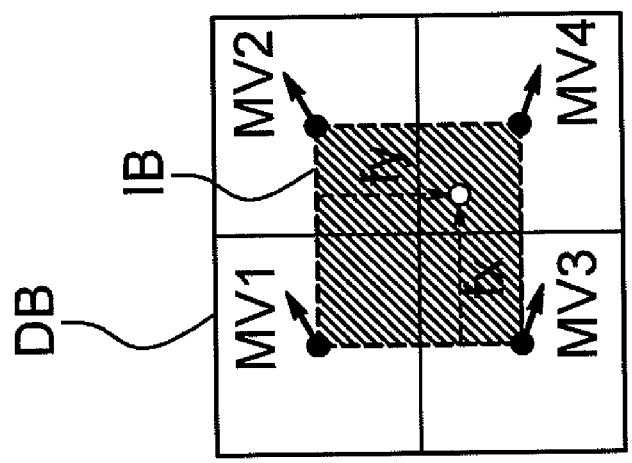
FIG. 1D shows a schematic diagram illustrating the block interpolation in a frame according to another embodiment of the invention.

The motion compensation interpolation circuit 12 performs compensation based on these motion vectors MV and interpolates the frame to generate at least one output frame. When the motion compensation interpolation circuit 12 according to one embodiment of the invention is in operation, a detecting block DB with predetermined size in the frame is used to perform interpolation. For example, as shown in FIGS. 1B, 1C, and 1D, the motion compensation interpolation circuit 12 in FIG. 1B uses four blocks, forming a criss-cross shape, as the detecting block DB in processing. After processing, the position is shifted right to the position shown in FIG. 1C to proceed the following process. Certainly, the invention is not limited to the case of using four blocks forming a criss-cross shape. A different number of blocks can also be used in processing. Furthermore, the sequence of moving directions of the detecting block can be adjusted when needed.

As shown in FIG. 1D, in the detecting block DB, the four blocks forming a criss-cross shape are the above mentioned blocks and each block corresponds to one vector where four blocks in the figure correspond to the vectors MV1, MV2, MV3, and MV4. The center hatched block is the interpolation block IB to be interpolated. The interpolation block IB also comprises N*M points. The distance between the interpolation block IB and the upper-left block is half of a block and there are four adjacent vectors MV1, MV2, MV3, and MV4 for every target pixel (x,y) to be interpolated in the interpolation block IB. According to the four vectors, the corresponding pixels P1, P2, P3, and P4 in the preceding or subsequent frame can be found.

Assuming the distance between the target pixel (x,y) and the upper-left point of the interpolation block IB is (fx,fy), the output pixel value Pout is as follows:

$$\begin{aligned} P_{12} &= (1-\Delta fx) \times P_1 + \Delta fx \times P_2 \\ P_{34} &= (1-\Delta fx) \times P_3 + \Delta fx \times P_4 \\ P_{out} &= (1-\Delta fy) \times P_{12} + \Delta fy \times P_{34} \\ &= (1-\Delta fy)(1-\Delta fx)P_1 + (1-\Delta fy)(\Delta fx)P_2 + \\ &\quad (\Delta fy)(1-\Delta fx)P_3 + (\Delta fy)(\Delta fx)P_4 \\ &= W_1 P_1 + W_2 P_2 + W_3 P_3 + W_4 P_4 \\ &\quad (W_1 + W_2 + W_3 + W_4 = 1) \end{aligned} \quad (1.1)$$

where Pn is the pixel value corresponding to the vector MVn of the point and n=1~4; $\Delta fx$ is the value (fx) of the horizontal distance in the hatched interpolation block IB divided by the length of the interpolation block IB; and $\Delta fy$ is the value (fy) of the vertical distance in the hatched interpolation block IB divided by the length of the interpolation block IB.

For example, it is assumed that the adjacent four vectors are (0,0), (0,0), (6,0), and (6,0) and the pixel values corresponding to the target pixel (x,y) to be interpolated are P1=100, P2=200, P3=300, and P4=400. It is also assumed that fx=4 and fy=8 for the target pixel (x,y) to be interpolated and the length and width of the interpolation block IB are 16*16. Thus, the output pixel value Pout is that Pout=(1−8/16)*(1−4/16)*100+(1−8/16)*(4/16)*200+(8/16)*(1−4/16)*300+(8/16)*(4/16)*400=225.

By this way, repeating the operation can calculate the output pixel value Pout for every pixel in the interpolation block IB and thereby calculate all the pixel values for the whole interpolated frame. However, not all the vectors of the adjacent blocks are highly reliable. Thus, it is required to assign weighting values to each vector based on the reliability of the vector.

Figure 2A:
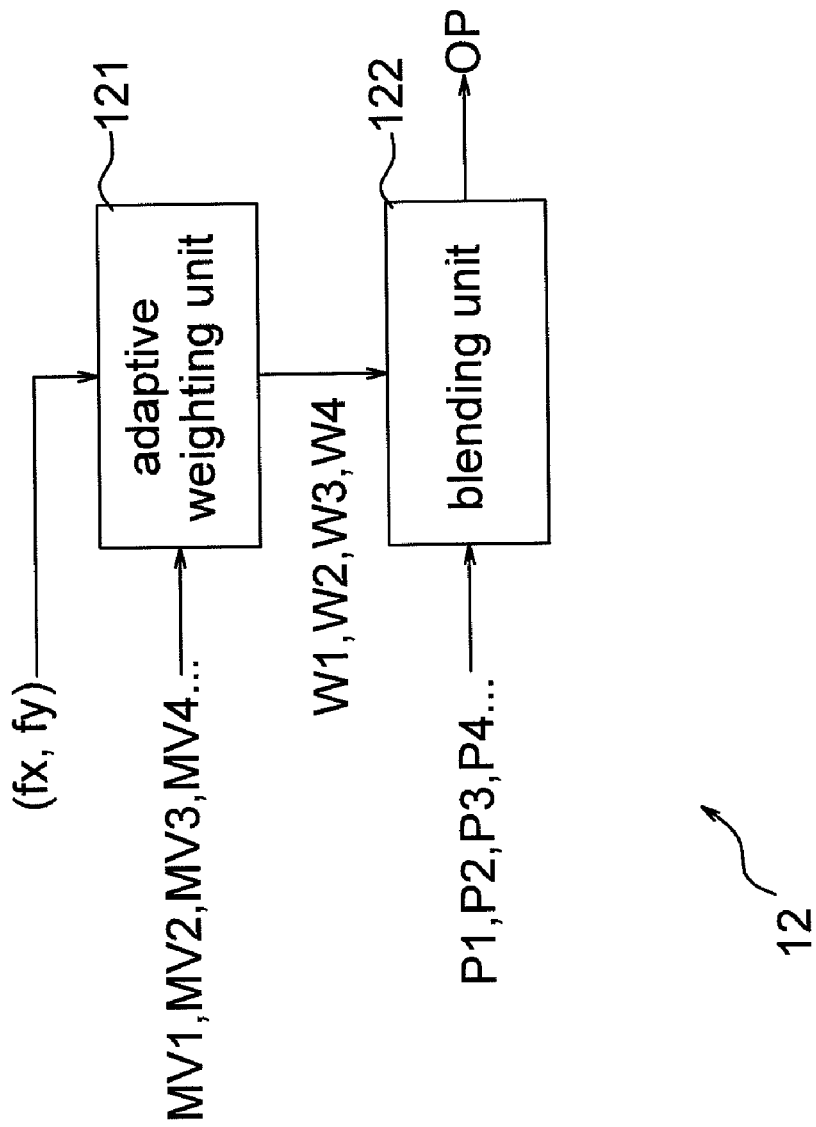
FIG. 2A shows a schematic diagram illustrating the adaptive blending motion compensation interpolation device according to one embodiment of the invention.

FIG. 2A shows a schematic diagram illustrating the adaptive blending motion compensation interpolation device 12 according to one embodiment of the invention. The interpolation device 12 comprises an adaptive weighting unit 121 and a blending unit 122. The adaptive weighting unit 121 receives at least one adjacent vector MV of an interpolation block IB where the interpolation block IB comprises one target pixel (x,y) to be interpolated and at least one weighting value W is generated after processing. The blending unit 122 receives at least one pixel value P corresponding to the at least one adjacent vector MV and processes at least one pixel value P based on the at least one weighting value W so as to generate the output pixel value Pout of the target pixel.

In the example shown in FIG. 2A, the adaptive weighting unit 121 receives four adjacent vectors MV1, MV2, MV3, and MV4 of an interpolation block IB where the interpolated position of the interpolation target pixel (x,y) is (fx,fy). The adaptive weighting unit 121 calculates the preferred vector MV in the four adjacent vectors and processes to generate the weighting values W1, W2, W3, and W4 provided to the blending unit 122 for the subsequent process.

The blending unit 122 receives the corresponding pixel values P1, P2, P3, and P4 of the four adjacent vectors and processes the pixel values P1, P2, P3, and P4 based on the weighting values W1, W2, W3, and W4 to generate the output pixel value OP of the interpolation target pixel.

It should be noted that the adaptive weighting unit 121 can output a proper weighting value W in order to have the result inclined to the vector MV having higher reliability. For example, if the reliability of the vector MV1 is higher than that of the other vectors, the weighting value W1 of the pixel value P1 corresponding to the vector should be increased.

For example, the following device and method can be used to determine the reliability of a vector and calculate the appropriate converting value. In one embodiment, as shown in FIG. 2B, the adaptive weighting unit 121 comprises a detail checking unit 121a, a motion estimation difference checking unit 121b, a vector coherence checking unit 121c, and a look-up table 121d. If the block that the vector corresponds to has one of the following property or combination thereof: high detail, low SAD, and high MV (moving vector) coherence, the vector has high reliability.

In one embodiment, the weighting value can be adjusted by adjusting the values of interpolation position fx, fy to thereby have the output pixel value OP inclined to the corresponding pixel value of the vector.

It should be noted that the device and method to determine the reliability of a vector are not limited to the above example and any other current device or any device to be developed in the future can be used in determination.

The checking method of the adaptive weighting unit 121 is as follows:

1. The detail checking unit 121a performs detail checking. The detail checking unit 121a checks details of each vector block. The vector block having higher detail is more sensitive to reflect the correct vector while searching the motion estimation difference. Thus, the vector block having higher detail should be chosen. The operation method of detail checking can use the following equation in calculation where the absolute difference between the vector block and the other block that is the lower-right block of the block is calculated. As the calculated value is larger, the value of detail is larger. The equation is shown in the following:

$$\sum_{block} (|F(x, y) - F(x+1, y+1)|) > threshold1 \quad (1.2)$$

Where "block" is the block, "F" is the frame, and "threshold1" is a first threshold value.

2. The motion estimation difference checking unit 121b performs low SAD checking. The motion estimation difference checking unit 121b calculates the motion estimation difference of the corresponding adjacent vectors of the interpolation block (such as MV1~MV4 shown in FIG. 1D). A smaller motion estimation difference indicates the higher reliability of the vector. Motion estimation difference checking can use the following equation to calculate:

$$\sum_{block} (|F0(x, y) - F1(x + MVx, y + MVy)|) < threshold2 \quad (1.3)$$

where "block" is the interpolation block, "F0" is the preceding frame, "F1" is the current frame, "MVx" and "MVy" are vectors, and "threshold2" is a second threshold value.

3. The vector coherence checking unit 121c performs moving vector coherence checking. Each vector is checked with the other adjacent vectors, separately. For example, the vector MV1 is checked with the vectors MV2~MV4, separately. If the vector MV1 to be checked is similar to the adjacent vectors, the reliability of the vector is higher and this vector is selected to be inclined to. The following equation can be used to calculate vector coherence:

$$\sum_{neighborhood} |neighborMV - MV| < threshold3 \quad (1.4)$$

where "neighborhood" is the adjacent block, "MV" is a vector to be checked, "neighborMV" is an adjacent vector of the vector to be checked, and "threshold3" is a third threshold value.

It should be noted that the block which a vector corresponds to having higher detail, low SAD, and high vector coherence indicates that this vector has higher reliability. Certainly, the invention can adjust the vector inclination based on the need of a designer. For example, only any one or two of the above checking methods are used in determination; or some other checking method or other current checking method or any checking method to be developed in the future can be used.

Figure 3:
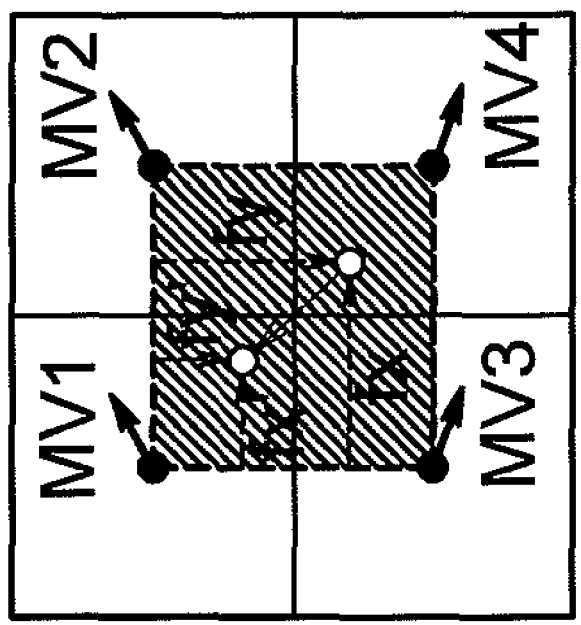
FIG. 3 shows a schematic diagram illustrating the block interpolation process in a frame according to another embodiment of the invention.

For the vectors having higher reliability, the look-up table 121d can be used to adjust the values of the interpolation position fx, fy to fx', fy' and adjust the weighting values W1, W2, W3, and W4 to the new weighting values W1', W2', W3', and W4' to achieve the effect of inclining to the corresponding pixel value, as show in FIG. 3. The equation is shown in the following:

$$P_{out} = (1 - \Delta fy')(1 - \Delta fx')P_1 + (1 - \Delta fy')(\Delta fx')P_2 + \quad (1.5)$$

$$(\Delta fy')(1 - \Delta fx')P_3 + (\Delta fy')(\Delta fx')P_4$$

$$= W_1'P_1 + W_2'P_2 + W_3'P_3 + W_4'P_4$$

$$(W_1' + W_2' + W_3' + W_4' = 1)$$

For example, if the vector MV4 passes "detail checking", "motion estimation difference checking", and "vector coherence checking", the vector has reliability. Then, the look-up table 121d is used to convert the values of the interpolation position fx, fy to obtain a larger weighting value W4'. The larger value W4' can reflect more P4 that is the pixel value of the vector MV4. Thus, the result can be inclined to the vector MV4 having the higher reliability by converting the values of the interpolation position fx, fy.

Figure 4A:
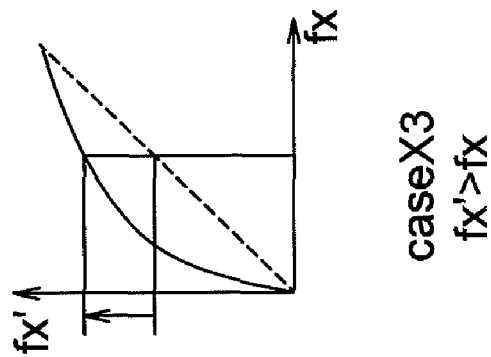
FIG. 4A shows a schematic diagram illustrating the vector weighting determination process according to one embodiment of the invention.
Figure 4A:
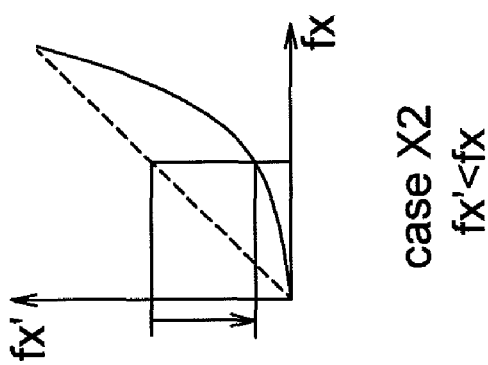
Figure 4A:
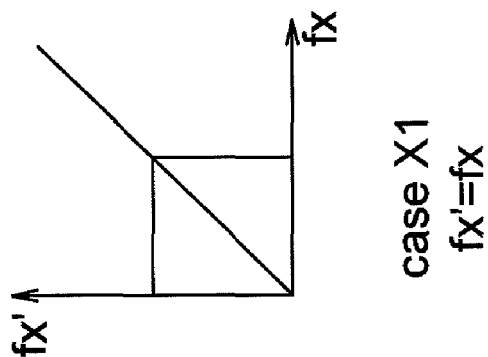
Figure 4B:
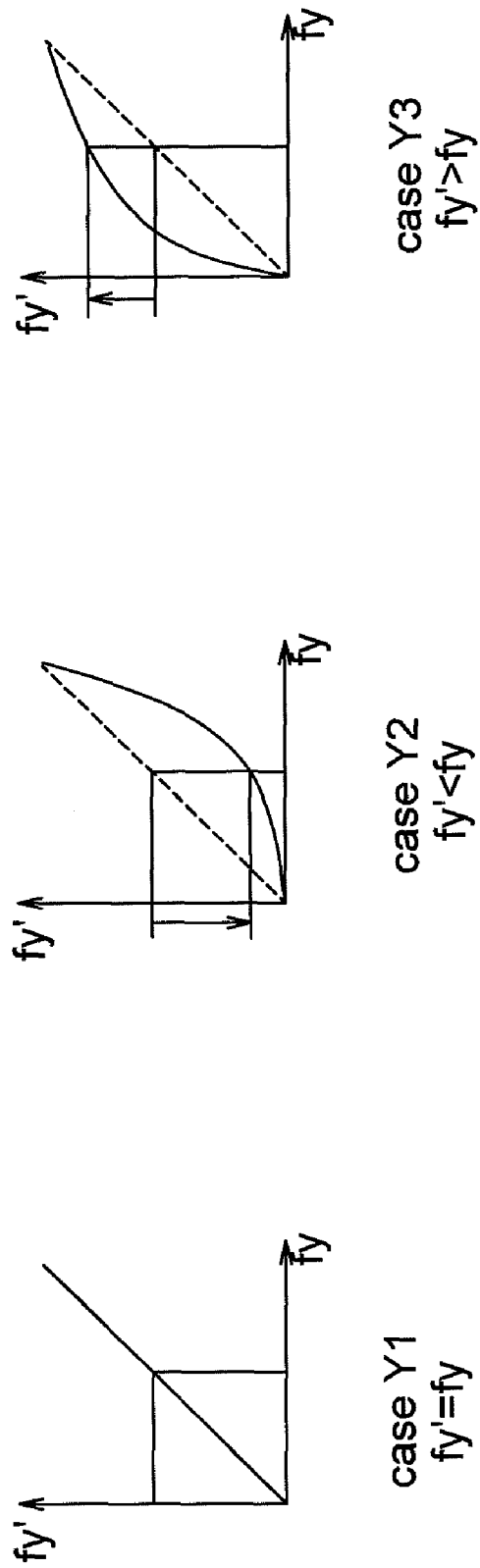
FIG. 4B shows a schematic diagram illustrating the vector weighting determination process according to another embodiment of the invention.

Converting the values of the interpolation position fx, fy can be done by utilizing the table built in the look-up table 121d, as shown in FIGS. 4A and 4B, illustrated as follows:

if it is the original linear interpolation, the case X1+case Y1 are selected as shown in FIGS. 4A and 4B;

if it is inclined to MV1 (upper left vector), the case X2+case Y2 are selected as shown in FIGS. 4A and 4B;

if it is inclined to MV2 (upper right vector), the case X3+case Y2 are selected as shown in FIGS. 4A and 4B;

if it is inclined to MV3 (lower left vector), the case X2+case Y3 are selected as shown in FIGS. 4A and 4B; and if it is inclined to MV4 (lower right vector), the case X3+case Y3 are selected as shown in FIGS. 4A and 4B.

For example, it is assumed that the adjacent four vectors are (0,0), (0,0), (6,0), and (6,0) and the pixel values corresponding to the target pixel (x,y) to be interpolated are P1=100, P2=200, P3=300, and P4=400. It is also assumed that the values of the interpolation position for the target pixel (x,y) are fx=4 and fy=8 and the length and width of the interpolation block IB are 16*16. Assuming that the vector MV4 is reliable after checked by the adaptive weighting unit 121, the case X3+case Y3 are selected and fx and fy are converted to be inclined to the vector MV4. Thus, fx'=8 and fy'=14 are obtained. These values are applied in the equation (1.5) and then the output pixel value Pout inclined to the vector MV4 is Pout=(1−14/16)*(1−8/16)*100+(1−14/16)*(8/16)
*200+(14/16)*(1−8/16)*300+(14/16)*(8/16)
*400=0.0625*100+0.0625*200+0.4375*300+
0.4375*400=325.

The weighting values W1'=0.0625, W2'=0.0625, W3'=0.4375, and W4'=0.4375 are obtained where W1'+W2'+W3'+W4'=1.

By this method, the way of inclining to the vector MV4 is repeated to calculate the output pixel values Pout of all the target pixels in the interpolation block IB to thereby generate a whole interpolated frame. That is, the output frame OF of the imaging generating device shown in FIG. 1A is generated. Since the output frame OF is generated from the vector(s) having higher reliability, the block artifacts in the prior art can be removed. Compared to the prior art that uses the method of blending adjacent blocks to reduce block artifacts, the method according to the invention is simpler and the reliability of the method according to the invention is higher. Thus, correctly reflecting adjacent blocks can be achieved.

It should be noted that, in one embodiment for the imaging generating device and the method thereof, if all the adjacent four vectors cannot pass the reliability test, the original linear interpolation is selected in blending. If there are more than two vectors having high reliability, one of them can be selected in processing.

It should be noted that the above description uses four vectors in processing but the invention is not limited to the above examples and can use a different number of vectors. The number of vectors in use can be equal to N where N is a positive integer less than infinity.

Figure 5:
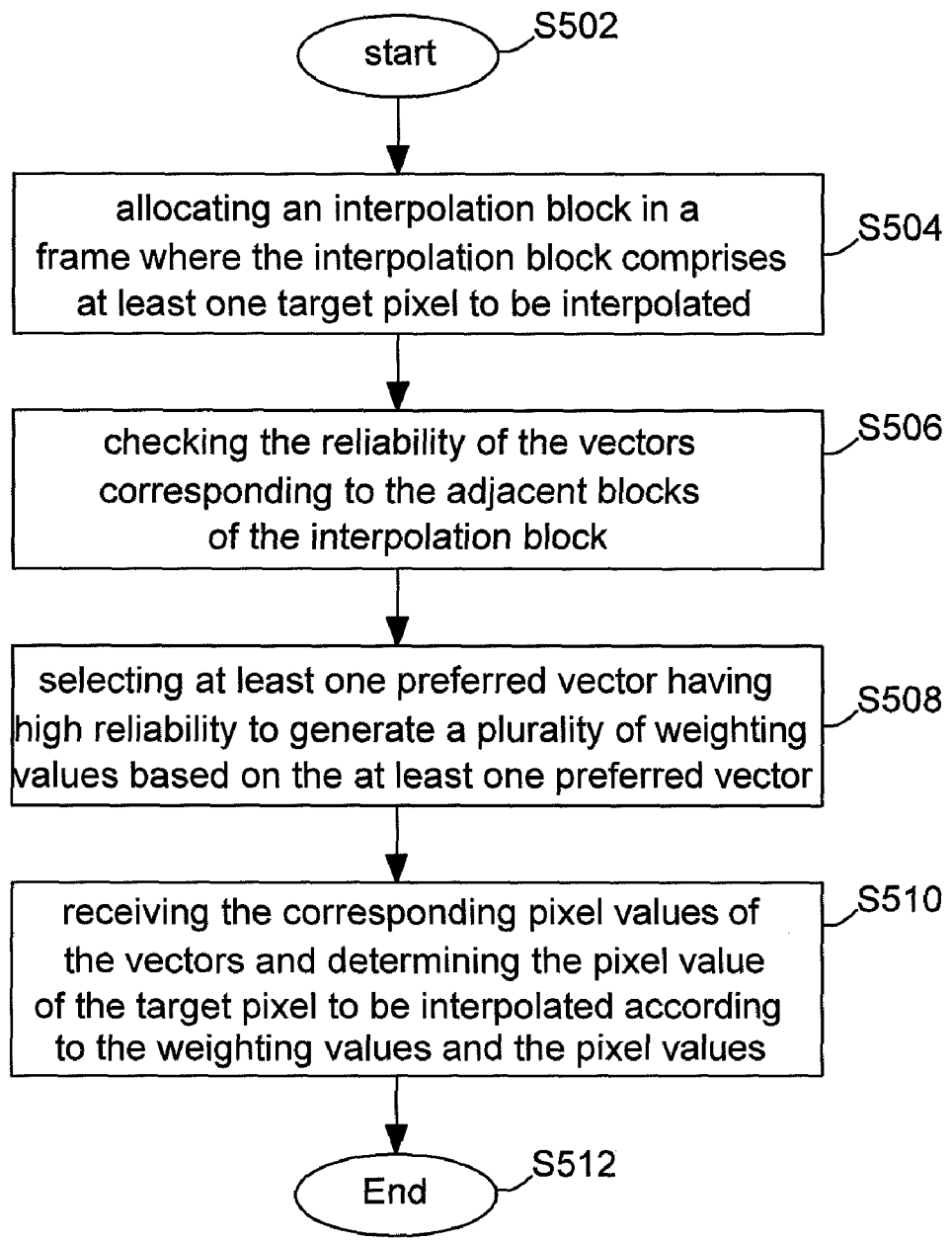
FIG. 5 shows a flow chart illustrating the adaptive blending motion compensation interpolation method according to one embodiment of the invention.

Moreover, FIG. 5 shows a flow chart illustrating the motion compensation interpolation method according to one embodiment of the invention. The method comprises the following steps:

Step S502: start;

Step S504: allocating an interpolation block in a frame where the interpolation block comprises at least one target pixel to be interpolated;

Step S506: checking the reliability of the vectors corresponding to the adjacent blocks of the interpolation block;

Step S508: selecting at least one preferred vector having high reliability to generate a plurality of weighting values based on the at least one preferred vector;

Step S510: receiving the corresponding pixel values of the vectors and determining the pixel value of the target pixel to be interpolated according to the weighting values and the pixel values; and Step S512: end.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A motion compensation interpolation device, comprising:
   an adaptive weighting unit, for receiving at least an input frame that comprises a plurality of blocks, allocating an interpolation block partially overlapping K adjacent blocks and comprising at least one target pixel to be interpolated, receiving K vectors corresponding to the K adjacent blocks and calculating K weighting values based on a size of the interpolation block and a first position of the target pixel; and
   a blending unit, for receiving K pixel values from a preceding or subsequent frame and generating pixel an interpolation value of the target pixel according to the K weighting values and the K pixel values;
   wherein K>=2 and the K pixel values are associated with the K vectors and the target pixel.

2. The device according to claim 1, wherein the adaptive weighting unit comprises:
   a detail checking unit, for checking details of blocks that the K vectors correspond to and generating a detail checking result; and
   wherein the adaptive weighting unit adjusts the weighting values according to the detail checking result.

3. The device according to claim 2, wherein the detail checking unit calculates an absolute difference between one block of the blocks that the K vectors correspond to and its corresponding block that is shifted to a lower right pixel from the one block.

4. The device according to claim 1, wherein the adaptive weighting unit comprises a motion estimation difference checking unit for calculating a sum of absolute differences between a first corresponding block in the input frame and a second corresponding block in the preceding or subsequent frame for each of the K vectors based on the interpolation block and generating a motion estimation difference checking result; and
   wherein the adaptive weighting unit adjusts the weighting values according to the motion estimation difference checking result.

5. The device according to claim 2, wherein the adaptive weighting unit comprises a motion estimation difference checking unit for calculating a sum of absolute differences between a first corresponding block in the input frame and its corresponding block in the preceding or subsequent frame for each of the K vectors based on the interpolation block and generating a motion estimation difference checking result.

6. The device according to claim 1, wherein the adaptive weighting unit comprises a vector coherence checking unit for checking the difference between any of the K vectors and the other vectors of the K vectors and generating a coherence checking result;
   wherein the adaptive weighting unit adjusts the weighting values according to the coherence checking result.

7. The device according to claim 5, wherein the adaptive weighting unit comprises:
   a vector coherence checking unit for checking the difference between any of the K vectors and the other vectors of the K vectors and generating a coherence checking result vector; and
   a look-up table for converting the first position of the target pixel into a second position according to at least one of the detail checking result, the motion estimation difference checking result and the coherence checking result and generating the weighting values;
   wherein the adaptive weighting unit adjusts the weighting values according to the size of the interpolation block and the second position.

8. The device according to claim 1, wherein K is an integer equal to 2 or 4.

9. The device according to claim 8, wherein the interpolation block is allocated in the center of the four blocks.

10. A motion compensation interpolation device, receiving an input frame where the frame comprises a plurality of blocks and a plurality of vectors correspond to the blocks, the device comprising:
    an adaptive weighting unit, for searching at least one interpolation block that comprises a target pixel and partially overlaps K adjacent blocks, and determining a vector having the highest reliability among K vectors of the K adjacent blocks to generate K weighting values based on a size of the interpolation block and a first position of the target pixel; and
    a blending unit, for receiving K pixel values from a preceding or subsequent frame and determining an interpolation value of the target pixel according to the K weighting values and the K pixel values for each target pixel to thereby generate at least one interpolated frame;
    wherein K>=2 and the K pixel values are associated with the K vectors and the target pixel; and
    wherein when a vector selected from the K vectors has at least one of the highest detail in its corresponding block, the lowest sum of absolute difference (SAD) block in its corresponding block, and the highest moving vector (MV) coherence, the vector is regarded as having highest reliability.

11. An image generating device, comprising:
    a vector estimation unit, for receiving a first frame and a second frame, dividing the first frame and the second frame into the same number of blocks, and comparing a target block with a predetermined search area of the second frame to calculate the vector of the target block;

an adaptive weighting unit, for allocating an interpolation block that partially overlaps K adjacent blocks and comprises at least one target pixel to be interpolated, receiving K vectors corresponding to the K adjacent blocks and calculating K weighting values based on a size of the interpolation block and a first position of the target pixel; and a blending unit, for receiving K pixel values from the first frame or the second frame and generating an interpolation value of the target pixel according to the K weighting values and the K pixel values so as to generate at least one interpolated frame between the first frame and the second frame;

wherein K>=2 and the K pixel values are associated with the K vectors and the target pixel.

12. The device according to claim 11, wherein the adaptive weighting unit further performs at least one of detail checking, motion estimation difference checking, and vector coherence checking on the K vectors to determine a vector having highest reliability; and wherein the adaptive weighting unit further adjusts the weighting values based on the vector having highest reliability.

13. The device according to claim 11, wherein the adaptive weighting unit comprises:

a detail checking unit, for checking details of blocks that the K vectors correspond to and generating a detail checking result;

a motion estimation difference checking unit, for calculating a sum of absolute differences between a first corresponding block in the first frame and its corresponding block in the second frame for each of the K vectors based on the interpolation block and generating a motion estimation difference checking result; and a vector coherence checking unit, for checking the difference between any of the K vectors and the other vectors of the K vectors and generating a coherence checking result.

14. The device according to claim 13, wherein the detail checking unit calculates a sum of absolute differences between one block of the blocks that the K vectors correspond to and its corresponding block that is shifted to a lower right pixel from the one block.

15. The device according to claim 13, wherein the adaptive weighting unit comprises a look-up table for converting the first position of the target pixel to be interpolated into a second position according to at least one of the detail checking result, the motion estimation difference checking result and the coherence checking result.

16. The device according to claim 11, wherein K is equal to 2 or 4.

17. A motion compensation interpolation method, comprising:

allocating an interpolation block in an input frame comprising a plurality of blocks, wherein the interpolation block comprises at least one target pixel to be interpolated and partially overlaps K adjacent blocks;

checking the reliability of K vectors corresponding to the K adjacent blocks;

determining at least one preferred vector having high reliability from the K vectors to generate K weighting values based on a size of the interpolation block and a first position of the target pixel; and receiving K pixel values and the target pixel from a preceding or subsequent frame and determining an interpolation value of the target pixel according to the K weighting values and the K pixel values;

wherein K>=2 and the K pixel values are associated with the K vectors and the target pixel.

18. The method according to claim 17, wherein the step of checking comprising:

checking the reliability of the K vectors by performing at least one of detail checking, motion estimation difference checking, and vector coherence checking on the K vectors.

19. The method according to claim 18, wherein the detail checking is performed by $$\sum_{block} (|F(x, y) - F(x+1, y+1)|) > threshold1$$

checking details of blocks that the K vectors correspond to.

20. The device according to claim 18, wherein the motion estimation difference checking is performed by $$\sum_{block} (|F0(x, y) - F1(x + MVx, y + MVy)|) > threshold2$$

calculating a sum of absolute differences between a first corresponding block in the input frame and a second corresponding block in the preceding or subsequent frame for each of the K vectors based on the interpolation block.

21. The device according to claim 18, wherein the vector coherence checking is performed by $$\sum_{neighborhood} |neighborMV - MV| < threshold3$$

checking the difference between any of the K vectors and the other vectors of the K vectors.

22. The method according to claim 17, wherein when a vector selected from the K vectors has at least one of the highest detail in its corresponding block, the lowest sum of absolute difference (SAD) in its corresponding block, and the highest moving vector (MV) coherence, the vector is regarded as having highest reliability.

* * * * *